April 18, 1933.  H. E. NICHOLS  1,903,832
CONSTANT SPEED MECHANISM
Filed May 4, 1927   5 Sheets-Sheet 1

Inventor
Horace E. Nichols,
By
Attorneys

April 18, 1933.  H. E. NICHOLS  1,903,832
CONSTANT SPEED MECHANISM
Filed May 4, 1927  5 Sheets-Sheet 2
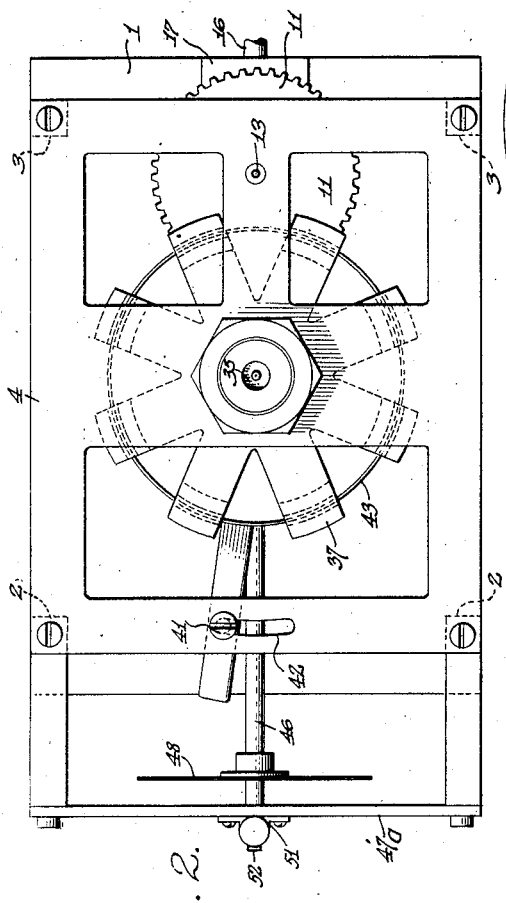
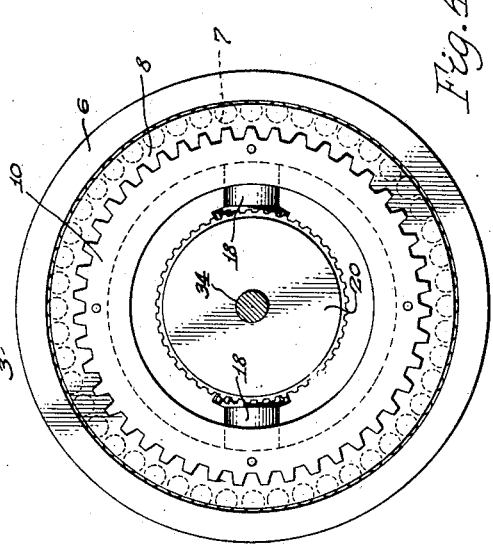
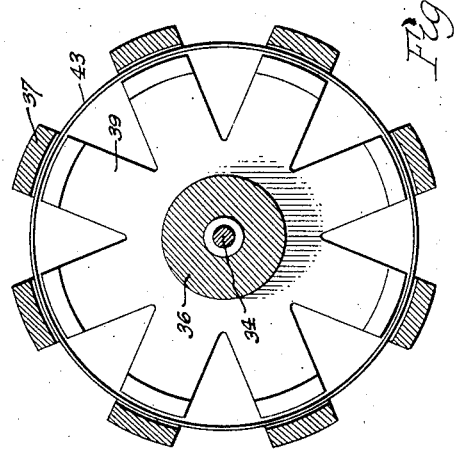
Inventor
Horace E. Nichols,
By
Attorneys April 18, 1933.  H. E. NICHOLS  1,903,832

CONSTANT SPEED MECHANISM

Filed May 4, 1927   5 Sheets-Sheet 3

Inventor
Horace E. Nichols,
By
Attorneys

April 18, 1933. H. E. NICHOLS 1,903,832
CONSTANT SPEED MECHANISM
Filed May 4, 1927 5 Sheets-Sheet 4

Inventor
Horace E. Nichols
By
Attorneys

April 18, 1933.  H. E. NICHOLS  1,903,832
CONSTANT SPEED MECHANISM
Filed May 4, 1927   5 Sheets-Sheet 5

Inventor
Horace E. Nichols,

By
Attorneys

Patented Apr. 18, 1933

1,903,832

UNITED STATES PATENT OFFICE

HORACE E. NICHOLS, OF REDFORD, MICHIGAN, ASSIGNOR OF ONE-THIRD TO CLYDE HARRISON CHASE, AND ONE-THIRD TO HUGO A. FREUND, BOTH OF DETROIT, MICHIGAN

CONSTANT SPEED MECHANISM

Application filed May 4, 1927. Serial No. 188,839.

This invention relates to a constant speed mechanism that may be advantageously used in connection with electrocardiographs, heliographs, heliotropes, and other types of light flashing apparatus. For instance, in an electrocardiograph a light beam is projected on to a mirror and reflected through a driven slitted shutter or flasher on to a sensitized film, and a motor or other source of power is employed for revolving the apertured shutter or flasher. Such an instrument is employed for making a visible and permanent record of heart actions and consequently the speed at which the apertured shutter or flasher is revolved must be constant in order to produce uniformity in representation of time intervals throughout the period of a diagnosis of a heart action. Other instances of timing may be in connection with the interruption or reflection of light beams; the operation of clock dials and time switches, and the controlling of relays and maximum demand meters.

My invention in its broadest aspect, involves driving and driven elements, with an element of power application interposed; first, as a power transmission device to permit the driving element imparting movement to the driven element, and second, as an instantaneous constantly active compensating device affording a load for the driving element, said load being unchanged when the movement of the driving element is decreased, or increased; the result being an imperceptible intermediary compensation of any variations of movement of the driving element, thus insuring constant uniform movement for the driven element.

My invention further aims to provide a constant speed mechanism wherein electromagnetic governors are associated with a differential mechanism for automatically maintaining a constant speed of a driven element by a driving element. Should the driving speed be increased or decreased the governors immediately rectify the same and establish constant driven speed, and this is accomplished by a durable and compact mechanism, which for an electrocardiograph or similar apparatus must be exceedingly compact, especially when the electrocardiograph is portable.

The constant speed mechanism will be hereinafter described and then claimed, and reference will now be had to the drawings, wherein Figure 1 is a longitudinal sectional view of the mechanism;

Fig. 2 is a plan of the same on a reduced scale;

Fig. 3 is a horizontal sectional view of an adjustable electromagnetic governor, taken on the line III—III of Fig. 1;

Fig. 4 is a similar view taken on the line IV—IV of Fig. 1, showing the differential mechanism;

Figure 1:
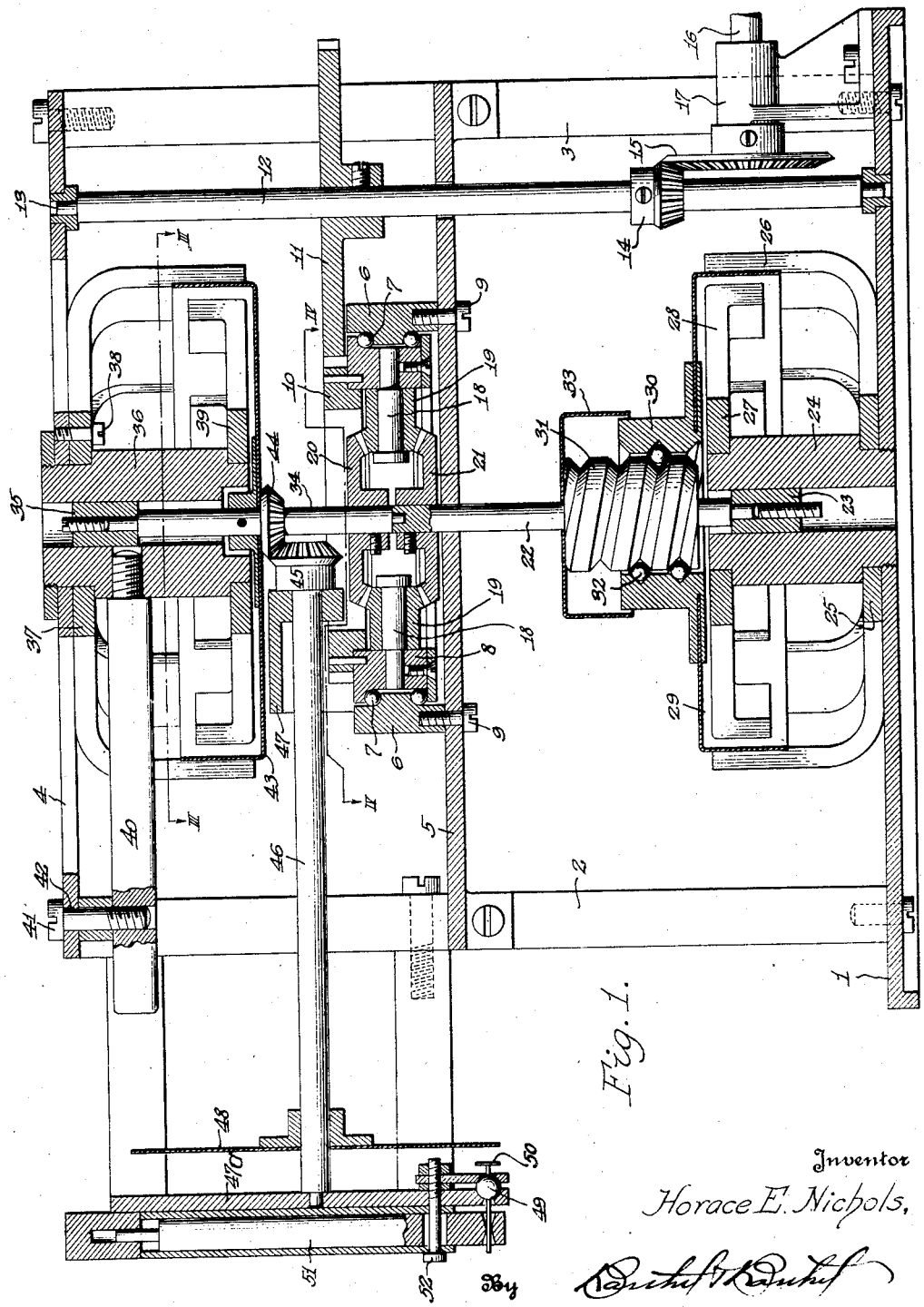

In the drawings, the reference numeral 1 denotes a base provided with sets of uprights 2 and 3 having the upper ends thereof connected by a frame 4 and intermediate the ends of said uprights is a platform 5.

Centrally of the platform 5 is the outer race member 6 of a horizontally disposed anti-frictional thrust bearing which includes two series of anti-frictional balls 7 and an inner race member 8 which is rotatably supported in the outer race member 6 by balls 7. The outer race member 6 may be secured to the platform 5 by screws 9 or any suitable fastening means.

Suitably fixed to the upper end of the inner race member 8 is a ring gear 10 constantly meshing with a horizontally disposed gear wheel 11 mounted on a vertically disposed shaft 12 having pintle ends 13 journalled in the base 1 and the frame 4. Adjacent the lower end of the shaft 12 is a small beveled gear wheel 14 meshing with a large beveled gear wheel 15 mounted on a drive shaft 16, journaled in a bearing 17 supported from the base 1. The shaft 16 may be driven by an electric motor or any suitable source of power (not shown).

The inner race member 8 which rotates with the ring gear 10 is provided with two or more inwardly projecting studs 18 for rotatable differential pinions 19 constantly meshing with horizontally disposed differential gears 20 and 21.

Gears 20 and 21 are axially alined and are carried respectively by the alined shafts 22 and 34, these shafts being mounted to permit relative rotatable movement therebetween; in Figure 1, the lower end of shaft 34 is shown as having a step bearing relation to the upper end of shaft 22, this being illustrative of a simple and compact arrangement by which the two shafts can be properly and efficiently arranged. The lower end of shaft 22 is shown as supported adjustably and rotatably by a jewel or pivot bearing 23 mounted in a post 24 carried by the base 1, the post being indicated as preferably screwed into the base. The upper end of shaft 34 is shown as journalled in a jewel or pivot bearing 35 mounted in a rotatably adjustable post 35 supported from the frame 4.

Shaft 34 carries a pinion 44 adapted to mesh with a complemental pinion 45 carried by a shaft 46, the inner end of the latter being journalled in a bearing 47 carried by platform 5, while the outer end of shaft 46 extends into a bracket 47a supported from the uprights 2. Said shaft 46 is designed to carry the part which is to be given the uniform and constant movement, such part, in the illustration, being shown as an apertured or slitted shutter 48 of an electrocardiograph, for instance. To complete the showing of the specific apparatus that co-operates with the shutter 48, it may be noted that the bracket 47a carries a universal support 49 for a mirror 50, said mirror being adjustable by a member 51 carried by the bracket 47a. Provision is also made, as at 52, for clamping the mirror in an adjusted position so that it cannot become accidentally displaced. The mirror 50 is in proximity to shutter 48, and a light beam projected on said mirror is adapted to be intermittently reflected through the apertures of the shutter 48.

In the structure thus far disclosed, it will be understood that shaft 12 constitutes a drive shaft the rotation of which will, through the connections shown, rotate ring gear 10 and the inner race member 8, the studs 18 of the latter being carried in an orbital path the center of which is the axis of gears 20 and 21, the movement of the studs being in synchronism with that of the drive shaft. The studs 18 carry the pinions 19 which mesh with gears 20 and 21, and it will be readily understood that if the load on shafts 22 and 34 is equal, so as to provide an equal load on the two gears 20 and 21, pinions 19 will not rotate on the studs, and the entire gear train, ringgear 10, inner race member 8, studs 18, pinions 19, and gears 20 and 21 will rotate as a unit; if, however, the load on one of the gears varies from that of the other, the orbital travel of the studs will cause the pinions 19 to rotate on their axes to set up a differential movement between the two gears 20 and 21. The arrangement thus has the characteristics of the usual differential mechanism, in which the difference in resistances serves to affect the differential action of the gear train. The adaptation of the differential mechanism to the particular uses contemplated by the present invention, however, is designed to give a somewhat different result from that which the usual differential mechanism is designed to produce. For instance, the purpose of the invention is to deliver the power and speed of shaft 12 to shaft 46, so that the latter will operate at the desired constant speed regardless of irregularities in speed of the shaft 12. If shaft 12 were certain to always operate with exact uniformity and speed,—the requirement placed on shaft 46—the gear train connections between the two shafts could be of simple nature with the usual arrangements for permitting variations in the relative speeds of the two shafts; such an arrangement would not require the use of a differential mechanism. The difficulty comes from the fact that although shaft 46 must have this uniform speed with exactness, the usual power structures are unable to provide a similar result upon shaft 12; hence, with the usual simple connection of gears, shaft 46 would partake of the variations which would be present in the speed of shaft 12.

The present invention is designed to remedy this condition, so that the variation in speed condition of shaft 12 will not be communicated to shaft 46 and the latter will have its rotations at uniform speed exactness. The result is obtained by a compensating mechanism of which the differential gear structure forms a part, and since it is impossible to foresee the variations of the power structure as to time and magnitude, it will be readily understood that the compensating mechanism is also required to act additionally as a detecting mechanism for detecting such variations, so that the compensating mechanism must operate automatically and be responsive with rapidity so that the variations of the shaft 12 will not be communicated to shaft 46 to materially affect the speed of the latter.

This result is obtained through utilizing the load conditions of the differential mechanism as a means for not only detecting the variations of shaft 12 but also to provide the compensating action. For instance, the load for shaft 34 can be made constant, while the load of shaft 22 is made variable. If, then, the speed of shaft 12 be varied, the effect of such variation will be carried into the differential mechanism and made active upon the shaft having the variable load, to effect a differential action which will compensate for the change, whether the speed change be in the direction of an increase or a decrease in speed of the shaft 12. In this respect, broadly, the present invention distinguishes from the usual differential mechanism functions. Specifically, the invention distinguishes to a much greater extent, as will be understood from the following:

Referring first, to what may be considered as the constant load in the above statement, the post 36 supports pole pieces 37 and 39, the pole piece 37 being located adjacent the upper end of post 36 and non-rotatably held against the frame 4 by a screw 38, while pole piece 39 is secured to the lower end of post 36. The pole pieces are of magnetic material with the poles of a piece arranged in spaced relation, pole piece 37 preferably having its poles extending in a direction to simulate an inverted cup, the arrangement being such that the poles of the two pieces are spaced apart in a more or less confronting position with respect to an annular channel between them, the latter being adapted to receive a cup-shaped drag-member 43 of non-magnetic material and which is mounted on shaft 34, the drag member thus being rotatable between the poles of the two pole pieces. Since the poles of a piece are spaced apart, it will be readily understood that zones of eddy current characteristic are set up within the magnetic field and provide a magnetic reaction which will tend to retard the rotation of the drag member, thus setting up the characteristics of a load upon the shaft 34.

In order to vary the load conditions of shaft 34, provision is made for manually shifting the poles of pole piece 39 relative to those of pole piece 37, so that the magnitude of the magnetic field can be controlled by the area of the zone of one pole which confronts the pole of the other pole piece. This shifting is provided by moving post 36 rotatively by a crank or handle 40 connected to the post and which is shown as having its outer end supported from frame 4 by a screw 41 which extends through a slot 42 in the frame 4, the slot permitting adjustment of the position of screw 41 which can be tightened to retain the crank in its adjusted position. It will be understood, of course, that in any adjusted position of the post, the load conditions set up by the magnetic field will remain substantially constant.

The variable load operates in connection with shaft 22, and also utilizes the action of a magnetic field produced by pole pieces 25 and 27, having poles 26 and 28, respectively, pole piece 25 corresponding to pole piece 37, while pole piece 27 corresponds to pole piece 39, pole pieces 25 and 27 being carried by post 24, the arrangement showing the pole pieces as inverted from the position of pole pieces 37 and 39. The drag member for this magnetic field structure is indicated as 29. Unlike the pole pieces 37 and 39, pole pieces 25 and 27 are not designed for adjustment to vary the magnetic field between them, post 24 being held stationary, as heretofore pointed out.

However, provision is made for obtaining the effect of a variation in the load characteristics of the magnetic field of pole pieces 25 and 27, this being done by varying the position of the drag member 29 vertically within the field produced by the poles. As will be understood, the retarding effect of the field on the drag member depends upon the area of the drag member which is directly within the field; if the skirt of the drag member extends throughout the field, as in Fig. 1, for instance, the drag member will be subject to the retarding effect of the complete field; if the skirt be raised so that it extends but partially into the field, only that portion of the skirt that is within the field will be affected, with the result that the retardation is decreased, and the load lessened accordingly.

Advantage is taken of this condition, by mounting the drag member on to what may be termed a large nut member 30 which has an internal coarse thread which is adapted to co-operate with the complemental thread of a screw 31 carried by a shaft 22, the thread relation being completed by the use of anti-frictional balls 32. A hood 33 overlies nut 30, as shown. By this arrangement, the drag-member 29 is supported by the shaft 22, but is secured thereto only through the screw and nut connection referred to, the weight of the nut constantly tending to move the drag member 29 downwardly and hence in the direction to increase the retarding effect of the field, whenever the member has been raised so as to reduce such effect. As will be understood, rotation of screw 31 will raise nut 30 unless the latter is travelling at the same speed with the screw, so that the arrangement of the two elements is such that the rotation of shaft 22 is constantly trying to raise the nut, while the weight of he latter is constantly attempting to cause the nut to travel down the screw; as a result the two forces set up a somewhat unstable condition which provides for a sensitive action.

This will be understood from the fact that under the conditions of opposing forces such as this, there is some position where the two become equal, and where this condition is present and maintained, the position of the nut vertically will remain constant. In the present arrangement, the weight of the nut being constant, the selection of the point of equilibrium of nut and screw is determined by the speed of rotation of the screw—an increase in speed raises the nut and the latter thus takes up a higher position on the screw as the point of equilibrium, taking a lower position when the speed of the screw is decreased, stability in position of the nut being obtained only where the speed of the screw is constant. Since the raising movement of the nut is in the direction to decrease the retardation of the drag-member, it will be understood that an increase of speed of shaft 22 will have the effect of decreasing the load provided by the retardation, while a decrease in speed of the shaft will increase the load effect. And, as will be readily understood, the change in speed is immediately detected by the nut and screw arrangement and an immediate response made to the change in conditions.

The effect of the shift in position of nut 30 is made manifest within the differential mechanism, through the variation in the load applied to shaft 22 through the retardation effect on the drag member. One of the general characteristics of a differential mechanism is that where the resistance is unequal, the tendency is for the power to be centralized on the part of lesser resistance—when the resistance is located wholly on one side of the differential the power is generally made manifest on the parts of the other side, thus speeding up that side of the mechanism relative to the other or greater resistance side. Hence, when a change in speed has been made manifest in the speed of the orbital travel of the studs 18, and initially made manifest, as by an increase in speed of shaft 22 with the consequent change in the value of the load on that shaft, the relative change in resistance on the opposite sides of the pinions 19 produces the reaction of causing the pinions to rotate on the studs, with the result that gear 21 is driven faster than gear 20—assuming the power speed to have increased— the faster movement of gear 21 tending to slow the speed of gear 20; the arrangement of the parts being such that the relative slowing of the movement of gear 20 leaves it travelling at the same speed as it travelled prior to the change in the power speed, the increase in power being absorbed in the increased speed of gear 21. If the power speed is a decrease instead of an increase, the action is opposite, in that the change in load characteristic between the two sides, has made the side of gear 20 of less resistance, and the greater power is exerted on that side through the action of the pinions, so that the speed of gear 20 still remains as before, the compensation being provided by the reduced speed of shaft 22 and gear 21.

It will be understood, of course, that the power device generally does not vary in speed to a wide extent, but that more or less fluctuation is present within narrow limits. At the proper speed of rotation of shaft 34, the nut 30 is in equilibrium at an intermediate point, and hence is able to shift in either direction with a resultant change in the position of the drag member 29 in its magnetic field, with the change made manifest through a variation in the retardation load on shaft 22. Ordinarily, the parts are so set that the nut is travelling at say twice the drive speed when in proper position, and where the power device is brought under service conditions which provides a material variation from the general standard which would produce the desired result, the load on shaft 34 can be varied by a change in position of lever 40, such change having the effect of restoring the desired conditions with regard to drag ring 29, so that the mechanism then takes care of the fluctuations in the power in the manner indicated.

As a result the arrangement, which can be termed an electro-magnetic governor, provides a practically instantaneous, constantly active, compensating device which is capable of controlling the activities of the shaft 22 by varying the magnetic flux conditions made active on the drag member 29. The parts are so set that a predetermined speed of shaft 22 will produce the proper speed of shaft 34, and when the speed of shaft 22 becomes varied through variation in speed of the power, the lines of force cut by the travelling drag member are changed in number by the shift in position of the drag member— through the shift in position of nut 30—and thus the load provided by the retarding effect is changed; if the speed of shaft 22 is increased, the number of lines of force that are active is decreased, and vice versa when the speed of shaft 22 is decreased below the predetermined speed.

As will be understood, the control is made manifest through the employment of a force which co-operates with but is made manifest in opposition to the force exerted by the power—the weight factor of nut 30 in co-operation with the screw 31; this factor is constantly present and active during the operation of the mechanism, and serves as a means for producing the immediate response of the governing mechanism to speed changes of the power device. Through its action in varying the extent of the active magnetic field as a direct response to the variations in speed of the power source, and at the same time prepared as a detector to note the next change, the nut and screw, within the relationship of a speed responsive shaft carrying the screw and the drag-member carried by the nut, with the nut and screw having the direct connection through the screw-thread relation, provides a structure which is especially fitted to meet the conditions of a governor in this type of devices.

As will be understood, this arrangement made up of a speed-responsive shaft, a magnetic field, and a non-magnetic drag-member operatively connected with the shaft by the nut and screw connection disclosed, sets up the conditions of a torque reaction variable as to value in response to variations in speed, and is brought into operative relation to the torque reaction of constant value produced by the magnetic field and drag member which, in this particular form of the invention is operatively connected to the driven shaft 34. In this particular embodiment of the invention, the magnetic-fields are produced by non-rotating members, but the invention is not limited in its application to such specific arrangement—as indicated in the modified structures hereinafter referred to.

Figure 6:
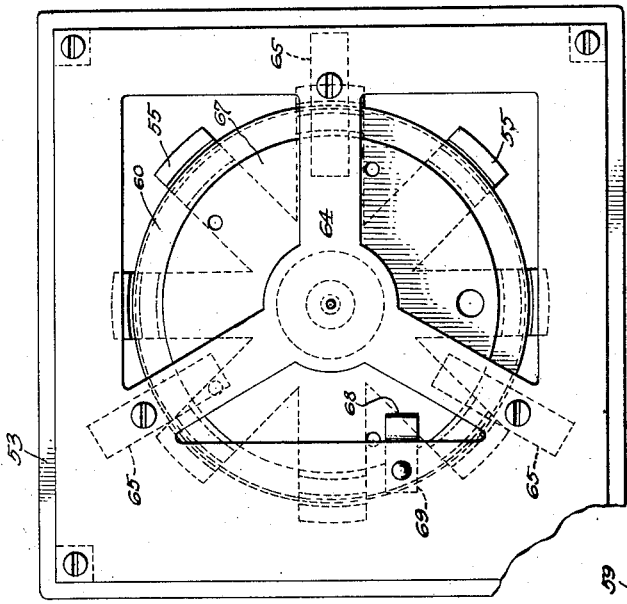
Fig. 6 is a plan view thereof.
Figure 5:
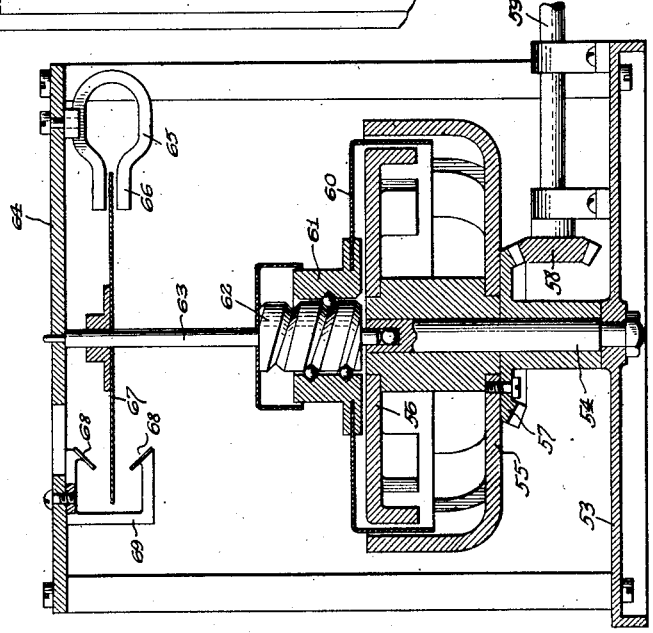
Fig. 5 is a vertical sectional view of another form of constant speed mechanism.

Nearly the same result may be obtained by another form of mechanism shown in Figs. 5 and 6 wherein a base 53 has a stationary post 54 and rotatable about said post is an outer pole piece 55 and an inner pole piece 56 constituting a driven rotary magnet. These pole pieces are driven by a beveled gear wheel 57 meshing with a similar wheel 58 on a motor driven shaft 59.

Extending between the pole pieces 55 and 56 is an annular drag member or armature 60 carried by a nut 61 operatively and anti-frictionally supported by balls relative to a screw 62 carried by a shaft 63 longitudinally alining with the post 54. The shaft 63 is supported by the upper end of the post 54 and by a frame 64 supported above the base 53.

Supported under the frame 64 are magnets 65 having pole pieces 66 and extending between said pole pieces is a horizontally disposed apertured shutter or disk 67 carried by the shaft 63.

Above and below the shutter 67 are mirrors or reflecting devices 68 arranged in opposed relation and supported by a bracket 69 from the frame 64. A beam of light is projected against one mirror to be reflected through apertures of the shutters 67 to the other mirror and from said mirror in a desired direction.

In this form, the magnets 65 and shutter 67 take the place of the magnets and drag member of the upper governor element of Fig. 1, to provide the torque reaction of constant value, the arrangement omitting the adjustable feature that is present in the disclosure of Fig. 1. The torque reaction of variable value is provided in a somewhat different way in this arrangement, in that a rotatable magnetic field is employed and serves as the speed-responsive element, the rotation of this element serving to rotate the drag member, the rotation of which operates the nut to raise it on the screw, the weight of the nut acting to provide a force to rotate the screw. As in the earlier form, the raising movement of the nut serves to vary the extent of the active magnetic field on the drag member, such variation producing a variation in the power of the magnet to rotate the drag-member, so that the conditions of variable slippage relatively is present between the magnet and drag member. The differential mechanism is omitted in this form, and hence the responsiveness of the governor to speed changes requires more time than in the form of Fig. 1, but the general action of the governor is, as in the earlier form, to maintain the speed of shaft 63 substantially constant regardless of the speed changes found in shaft 59.

Figure 8:
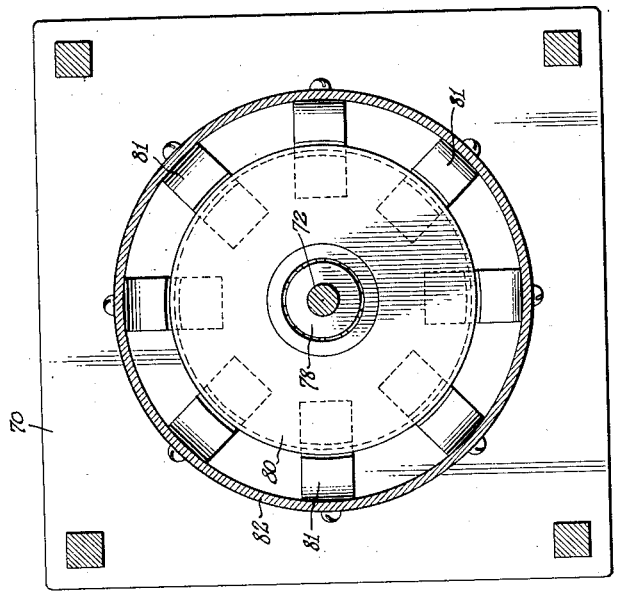
Fig. 8 is a horizontal sectional view taken on the line VIII—VIII of Fig. 7.
Figure 7:
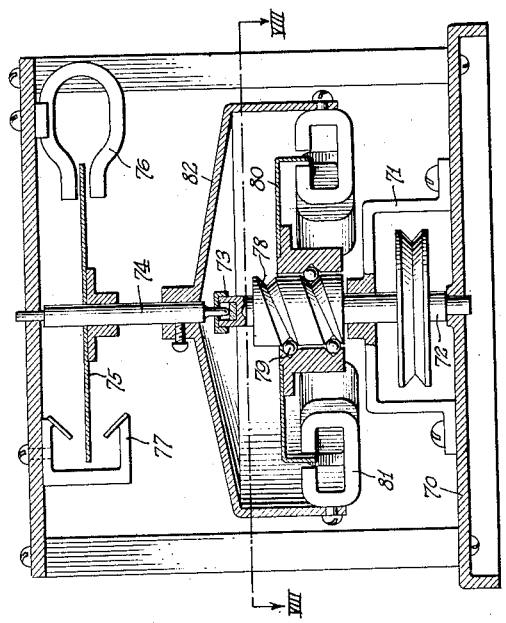
Fig. 7 is a view similar to Fig. 5, illustrating another form of timer.

Reference will now be had to Figs. 7 and 8 wherein a base 70 has a bearing 71 cooperating therewith in supporting a vertical driven shaft 72 which has its upper end provided with a bearing 73 for a shaft 74 supporting a shutter or disk 75 operatively related to a magnet 76 and reflectors 77, as described in connection with Figs. 5 and 6.

The shaft 72 is provided with a screw 78 and balls 79 are adapted to support a drag member or armature 80 relative to pole pieces 81, carried by a casing 82 mounted on the shaft 74. This arrangement is more or less of a reversal, structurally, of that disclosed in Fig. 5, in that the pole pieces of the magnetic-field are driven by the drag-member and are directly connected to the shaft that is to be driven at constant speed. The screw is carried by the speed-responsive shaft and the action of the nut is more or less analogous to the arrangement of Fig. 1, the raising movement serving to vary the area of the drag member that is present within the magnetic field and hence serving to set up the conditions of a variable slippage as between the magnetic field and the drag member. The torque reaction of constant value is provided by a structure similar to that of Fig. 5, the difference in the structure of the source of the torque reaction of variable value being the primary difference between this arrangement and that of Fig. 5. The structure also omits the differential mechanism with consequent need of a greater length of time to provide complete responsiveness to the speed change conditions.

Figure 9:
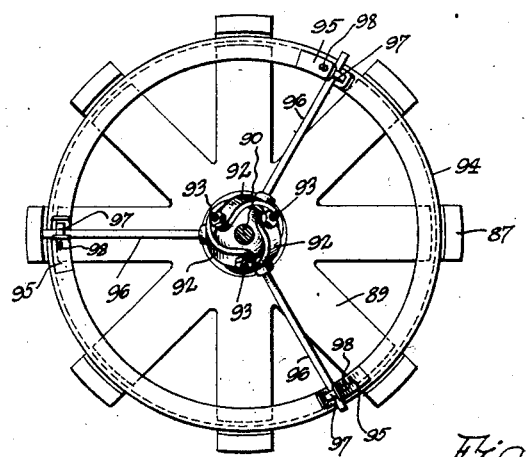
Fig. 9 is a plan view of still another form of timer.
Figure 10:
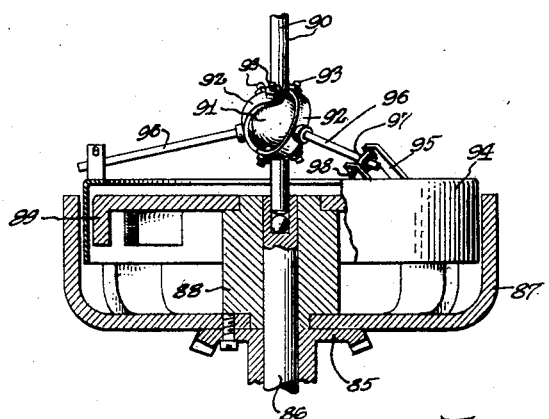
Fig. 10 is a transverse vertical section thereof.

Figures 9 and 10 show a modified construction assembled in the same general way as the device shown in Figures 5 and 6. A driven gear wheel 85 rotates on a stationary post 86 and is secured to outer pole pieces 87. A block 88 rotatable about the post 86 above the gear 85 is secured at its lower end to the pole pieces 87 and carries inner pole pieces 89 at its upper end. A shaft 90 is mounted rotatably and anti-frictionally in the upper end of the post 86 and is formed with a sphere 91. The sphere carries several arcuate clips 92 disposed at an angle of about 45° to the horizontal and held to the sphere by set screws 93 passed through the ends and seated in shallow sockets on the surface of the sphere. The annular drag member or armature 94 is mounted between the outer pole pieces 87 and the inner members 89 in the same manner as shown in Figures 5 and 6. The member 94 is struck up from the top to form pairs of spaced ears 95 equal in number to the clips 92. From the end of each clip extends a spindle 96 carrying at its outer end a disk or cross piece 97 having its ends journalled as at 98 between the members 95.

In this form, the distinction over the form of Fig. 5 is in the substitution of a different mechanism for the nut and screw. With clips 92 set at an angle, it will be understood that any variation in the angular velocity of the drag member 94, will tend to advance or retard the movement of members 95 relative to the spindles 96, so that the movement would change the position of the spindles due to the connection with members 95; since any change in position of members and spindles will be on the inclined axis, such change will serve to raise or lower the spindles, dependent on the direction of movement, thus shifting the position vertically of the drag member in the magnetic field. The clips, spindles and drag-member thus have characteristics of the nut of Fig. 5—the long leverage of the spindles enabling the drag member to provide the factor of weight that is present in the nut; the inclination of the axis of the clips serves the purpose of the threaded connection between the screw and nut, the ball taking the place of the body of the screw. The general action is somewhat similar to that which is present in the arrangement of Figure 5.

From the above it will be understood that in each instance the driven shaft has a load of constant value, the power or drive shaft being capable of variable movement, the purpose being to connect the two operatively by a governing mechanism which serves to effect a compensation such as will deliver the variable speed of the drive shaft to the driven shaft as a constant speed, the speed variations being substantially eliminated, so that the speed of the driven shaft remains substantially constant. In the governing mechanism, each of the forms includes an element that is responsive to the speed of the drive shaft, and an element co-operative therewith capable of producing a power factor—made manifest as a weight or gravitational force—which is of constant value. The governing mechanism, in each instance, includes a magnetic field within which a member is shiftable to vary the flux value of the field upon the member, the member movements being subject to the action of the force of constant value, the position of the member in the field being designed to control the speed of travel of the member.

In each case the effect produced is that of a torque reaction within the governing mechanism variably responsive to the speed variations of the drive shaft, with this reaction variations compensatory to the speed variations, and actively co-operating with a torque reaction of constant value included in the driven shaft mechanism, the latter providing a load factor of constant value which is active in the developing of the torque reaction of variable value. As will be understood the connections between the drive and driven shafts provide for complete drive action, but there is at least one point in the drive progression where the direct drive is broken, and the drive continued by an auxiliary force, which may be the weight force or the force of the magnetic field, or both in co-operation, with the exception of the form of Fig. 1 in which the drive progression is direct, through the differential, the break effect being present within the connection to the variable load.

In each of the forms there is a load of constant value and a load of variable value. These may oppose each other, as in Figs. 1 to 4, or they may be in series as in the remaining forms, the variable load in the latter forms forming a part of the drive connections; because of the latter characteristic—as part of the drive connections—the arrangement may tend to take on the characteristics of a power device rather than a load. But in each of the forms there is a gravitational element which is active in controlling the torque reaction applied to the driven shaft to maintain the speed of the latter shaft constant.

The simple form of device shown in Figs. 7 to 10, provides a combined magnetic and gravitational governor that may be used for many purposes.

While I have herein shown and described several ways in which the invention may be carried into effect, it will be readily understood that various changes and modifications other than those indicated—and which are more or less illustrative—may be found desirable or essential in meeting the exigencies of service, and I desire to be understood as reserving the right to make any and all such changes or modifications, as may be found desirable or essential, insofar as the same may fall within the spirit and scope of the invention as expressed in the accompanying claims when broadly construed.

What I claim is:—

1. In a timing device, a driven shaft, a driving shaft, and a governor transmitting power from said driving shaft to said driven shaft, said governor, including a screw and nut drive in which the nut provides a gravitational element.

2. A timing device as called for in claim 1, wherein said governor includes means operative to produce a magnetic reaction for said screw and nut drive.

3. A governor for a driven element adapted to maintain a constant speed of the driven element in presence of a drive source subject to variations in speed characteristic, said governor comprising a rotary magnet, a gravitational drag member in the magnetic field of said magnet, and means adapted to transmit power from said drag member to the driven element.

4. A governor as called for in claim 3, wherein said means includes a nut and screw operative to provide for gravitational action of the drag member.

5. In a constant speed mechanism wherein the speed of a driven shaft is maintained constant independent of the speed of a driving shaft:—a nut and screw drive between said shafts, and a magnet providing a load condition for said nut, said nut being constructively arranged to vary the effective flux of said magnet and thereby maintain a constant load for said nut.

6. In a constant speed mechanism wherein the speed of a driven shaft is maintained constant independent of the speed of a drive shaft, a driving magnet having a magnetic field, and a gravitational element supported from the driven shaft to be operative in said magnetic field and shiftable by speed variations so that said driven magnet may impart rotation to the driven shaft.

7. A constant speed mechanism as called for in claim 6, wherein said gravitational element is supported to permit gravity action thereon to provide for automatic adjustment thereof to vary the effective flux of the magnetic field of said magnet.

8. Means for compensating for variations in the speed of a driving element so as to maintain a driven element at a constant speed, said means comprising a magnet driven by the driving element, a member driven by said magnet and adapted to be adjusted to regulate the driving force of said magnet, and means transmitting power from said member to said driven element, said means causing adjustment of said member when there is any variation in the speed of said driving element.

9. A constant speed mechanism including a driving element, a driven element free from direct drive connection with, but adapted to be driven by said driving element, a control element for said driven element by which power is transmitted from said driving element to said driven element, said control element reacting to variation in the speed of said driving element, and means exerting a drag of constant value on said control element and co-operating with the latter to maintain the speed of the driven element constant in presence of drive speed variations.

10. The combination of a driven rotary magnet, having an annular magnetic field, an armature movable coaxially of said magnet and adapted to be rotated at a predetermined speed by said magnet with the speed of armature rotation in ratio to the effective flux of the magnetic field, and means carried by said armature brought into action by either reduced or increased speed of said magnet to either increase or decrease the effective flux of said magnet and maintain constant speed for driven element.

11. In a constant speed mechanism, a driving element having a variable speed of rotation, a driven element free from direct drive connection with, but adapted to be rotated by said driving element at a constant speed, loading means for the driven element requiring a torque proportional to the speed of the driven element, and driving means permitting a slippage between the driving and driven elements, said driving means being of non-frictional characteristic and being operative to automatically control the slippage in presence of drive speed variations, to cause the torque between the driving and driven elements to remain constant irrespective of the speed of the driving element, and said torque driving the driven element at a constant speed against said loading means.

12. In mechanism wherein the speed of a driven shaft is adapted to be maintained constant regardless of speed changes of the drive shaft, a driven shaft having a load of constant value to produce a torque reaction constant in value, a drive shaft, and means operatively interposed between said shafts and rendered active by drive shaft movements and responsive to drive speeds of the drive shaft, said means being operative to automatically produce an independent torque reaction within the means with the value of the latter torque reaction determined by the speed of the drive shaft and variable in presence of drive speed variations with such torque reaction variations compensatory to the speed variations, said means including a load for producing the torque reaction and variable as to value by the variations in drive speed, the respective loads being independent of one another physically and each including a member and a magnetic field movable relatively to each other.

13. Mechanism as in claim 12 characterized in that the member is annular with the relative movement in the direction of angular length of the member.

14. Mechanism as in claim 12 characterized in that the member is annular and rotatable, said member having also a movement relative to the field in the direction of the member axis.

15. Mechanism as in claim 12 characterized in that the member is annular and weighted to produce a gravitational force active in producing the torque reaction.

16. Mechanism as in claim 12 characterized in that the means includes a weighted-nut and screw mechanism with the nut connected to the member, the nut and screw mechanism being active in controlling the position of the member in the magnetic field.

17. In a constant speed mechanism, a drive means, a shaft to be driven, mechanism operatively interposed between the means and shaft and including a gravitational element, said element being co-related with the means and shaft with the element driven by the means, said element by its gravitational movements being operative in maintaining constancy in shaft speed in presence of speed variations of the means.

18. A constant speed mechanism as in claim 17 wherein the element and means are disposed about a common axis.

In testimony whereof I affix my signature.

HORACE E. NICHOLS.